United States Patent
Moon

(10) Patent No.: US 7,089,629 B2
(45) Date of Patent: Aug. 15, 2006

(54) MOUNTING STRUCTURE OF AN INNER HANDLE FOR A VEHICLE

(75) Inventor: Bo Seung Moon, Gwangju (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/023,695

(22) Filed: Dec. 27, 2004

(65) Prior Publication Data

US 2006/0032024 A1  Feb. 16, 2006

(30) Foreign Application Priority Data

Aug. 13, 2004  (KR) .............. 10-2004-0063710

(51) Int. Cl.
*A45C 3/00* (2006.01)

(52) U.S. Cl. .............. 16/438; 16/413; 16/422

(58) Field of Classification Search .......... 16/406, 16/412, 413, 422, 426, 429, 435, 436, 440, 16/444, 446, DIG. 7, DIG. 12, 24, 438, 415, 16/DIG. 40–41, DIG. 43, 418–420, 430; 296/71, 1.02; 280/748; 206/335; 7/143, 7/146; 81/20

See application file for complete search history.

(56) References Cited

U.S. PATENT DOCUMENTS

| | | | | |
|---|---|---|---|---|
| 4,882,956 A | * | 11/1989 | Lang | 81/20 |
| 4,912,809 A | * | 4/1990 | Scheuer | 16/413 |
| 5,642,567 A | * | 7/1997 | Lin | 30/366 |
| D385,771 S | * | 11/1997 | Chiang | D8/105 |
| 6,594,862 B1 | * | 7/2003 | Totani et al. | 16/430 |
| 2002/0020042 A1 | * | 2/2002 | Kurachi et al. | 16/438 |
| 2003/0126721 A1 | * | 7/2003 | Panek et al. | 16/409 |

FOREIGN PATENT DOCUMENTS

DE  4016612 A1 * 11/1991

* cited by examiner

*Primary Examiner*—J J Swann
*Assistant Examiner*—Mark T. Vogelbacker
(74) *Attorney, Agent, or Firm*—Morgan Lewis & Bockius LLP

(57) ABSTRACT

A mounting structure of an inner handle for a vehicle having an inner handle serving as an emergency hammer to break or smash the windows of a vehicle in the event of the emergency. The mounting structure of the inner handle includes an inner handle having a grabbing part and connecting parts perpendicularly extending from both ends of the grabbing part. A hammer head made of a high-strength material, the hammer head installed to the end of the connecting part. A locking means rotatably mounted around the circumference of the hammer head and the connecting part and a stopping means preventing unintentional rotation of the locking means. The vehicle pillar trim being configured to receive the inner handle.

8 Claims, 6 Drawing Sheets

US 7,089,629 B2

MOUNTING STRUCTURE OF AN INNER HANDLE FOR A VEHICLE

CROSS REFERENCE TO RELATED APPLICATION

This application is based on, and claims priority to, Korean Patent Application No. 2004-0063710, filed on Aug. 13, 2004, the disclosure of which is hereby incorporated by reference.

TECHNICAL FIELD OF THE INVENTION

The present invention generally relates to a mounting structure of an inner handle for a vehicle. More particularly, in the event of emergency the inner handle can serve as an emergency hammer to break a window of the vehicle and provide an escape route.

BACKGROUND OF THE INVENTION

Generally, a passenger vehicle is provided with pillars for supporting a roof panel. The pillars typically include a front pillar disposed between a windshield and a front door window, a center pillar disposed between the front door window and a rear door window, and a rear pillar disposed between the rear door window and a rear glass. Inside of the vehicle, the pillars are covered by trims for an aesthetically pleasing appearance. A ceiling part, the surface of the roof panel facing an inside of the vehicle, is likewise covered by a headlining.

In a passenger vehicle, inner handles are typically installed to the headlining adjacent to the upper end of a front door and a rear door, respectively. The handles provide a grip for a passenger's safety in case where the vehicle suddenly decelerates or rounds a curve with high speed. Furthermore, in a vehicle having high ground height such as a van or a truck, the inner handle may be useful to facilitate passengers in boarding the vehicle.

Buses and other vehicles are often equipped with emergency hammers. In the event of traffic accidents or emergency situations, where passengers are locked inside these vehicles, these passengers may use the hammers to break or smash the glass of the windows of the vehicle in order to escape from the vehicle. Therefore, it is preferable to provide every vehicle with an emergency hammer or other kind of equivalent for ensuring the safety and escape of the passenger from the vehicle. However, such a provision of the emergency tool is disadvantageous in light of requiring an additional cost and space constraint inside a vehicle.

SUMMARY OF THE INVENTION

It is an object of the present invention to provide a mounting structure of an inner handle for a vehicle in which the inner handle serves as an emergency hammer in the event of emergency. The handle being detachably installed to a pillar trim of a vehicle.

To achieve this object of the present invention, one embodiment of a mounting structure of an inner handle for a vehicle comprises an inner handle having a grabbing part and connecting parts perpendicularly extended from both ends of the grabbing part. The ends of the connecting parts are furnished with a hammer head made of a high-strength material. A locking means is rotatably mounted around the circumference of the hammer head and the connecting part. The connecting part includes a stopping means that prevents unintentional rotation of the locking means. A pillar trim and a body panel are provided with openings into which the connecting parts of the inner handle are detachably fit.

Preferably, the locking means comprises a hollow body, an inserting rim inwardly extending from the rear end of the hollow body, a couple of locking tips outwardly extended from the front end of the hollow body, and a supporting rim outwardly extended from the hollow body adjacent to the locking tips. More preferably, the stopping means comprises a recess formed on the surface of the connecting part, a spring inserted in the recess, and a boss resiliently supported by the spring. The locking means further comprises a fitting hole for engaging with the boss at the surface of the body.

The connecting part of the inner handle further comprises an inserting groove along the circumference. The inserting rim of the locking means is rotatably fit into the inserting groove. The diameter of the opening formed in the pillar trim is at least the same as the diameter of the supporting rim formed around the body of the locking means. The opening formed in a body panel is provided with an additional open section corresponding to the couple of locking tips.

BRIEF DESCRIPTION OF THE DRAWINGS

The aforementioned aspect and other features of the present invention will be explained in the following detailed description, taken in conjunction with the accompanying drawings, wherein.

DETAILED DESCRIPTION OF PREFERRED EMBODIMENTS

Figure 1:
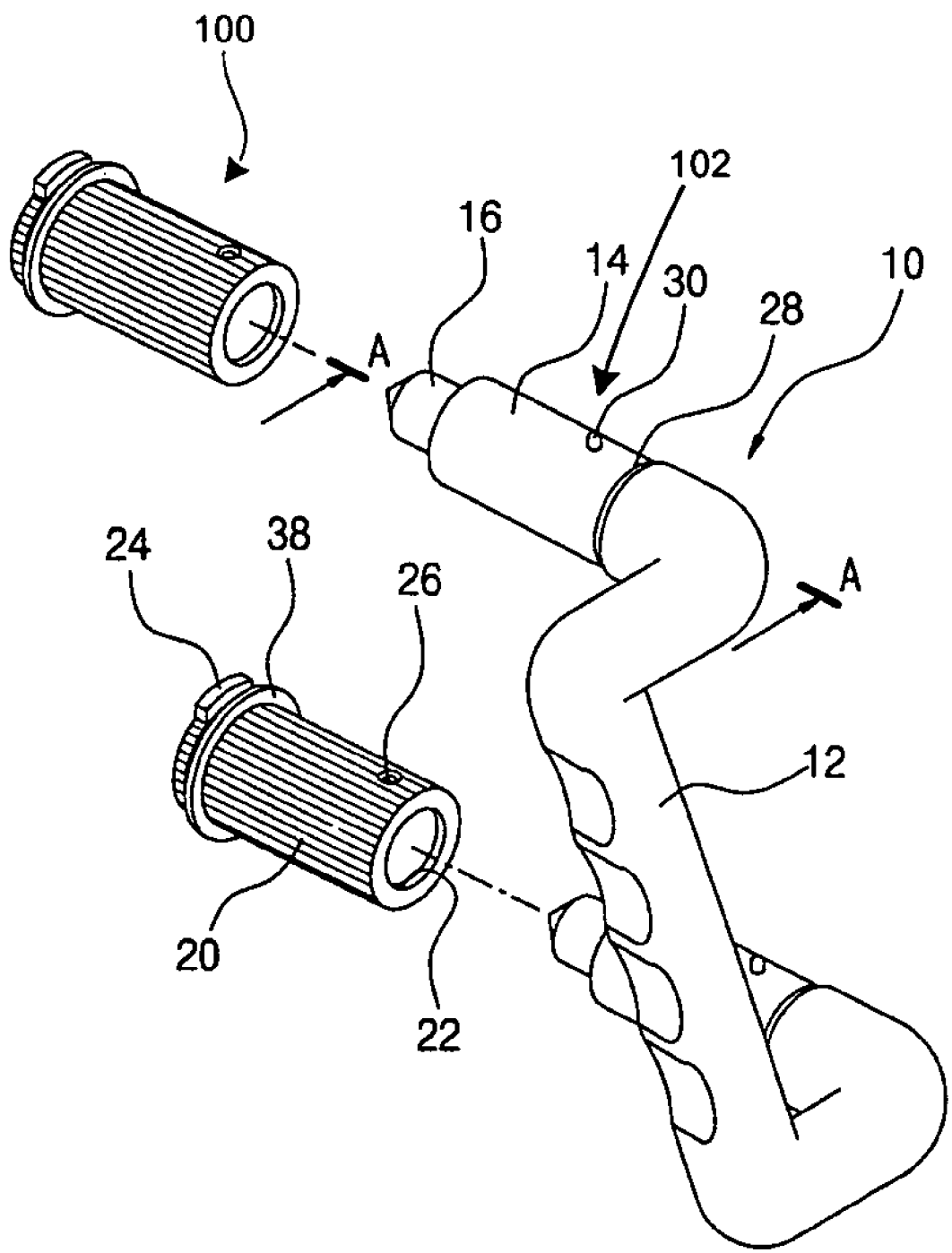
FIG. 1 is an exploded perspective view of an inner handle of a vehicle according to an embodiment of the present invention.

Referring to FIG. 1, an inner handle 10 has an elongated grabbing part 12 and connecting parts 14 perpendicularly extended from both ends of the grabbing part 12. Provided at the ends of the connecting parts 14 of the inner handle 10 is a hammer head 16 made of a high-strength material. Preferably, the high-strength material may be metal. The hammer head 16 is fixed to the ends of the connecting part 14 via frictional-fit engagement Alternatively, the attachment of the hammer head 16 to the connecting part may be accomplished by other conventional engaging method, such as a clamping means.

A locking means 100 encompasses the circumference of the hammer head 16 and the connecting part 14 of the inner handle 10. The locking means 100 is rotatable relative to the hammer head 16 and the connecting part 14. The locking means includes a hollow body 20 of a cylindrical shape. The body 20 comprises an inserting rim 22 inwardly extended from the rear end of the body 20. A couple of locking tips 24 having substantially rectangular shapes radially extended is integrally formed at the front end of the body 20. Moreover, the locking means is provided with a supporting rim 38 outwardly extended from the hollow body 20, adjacent to the locking tips 24.

Figure 5:
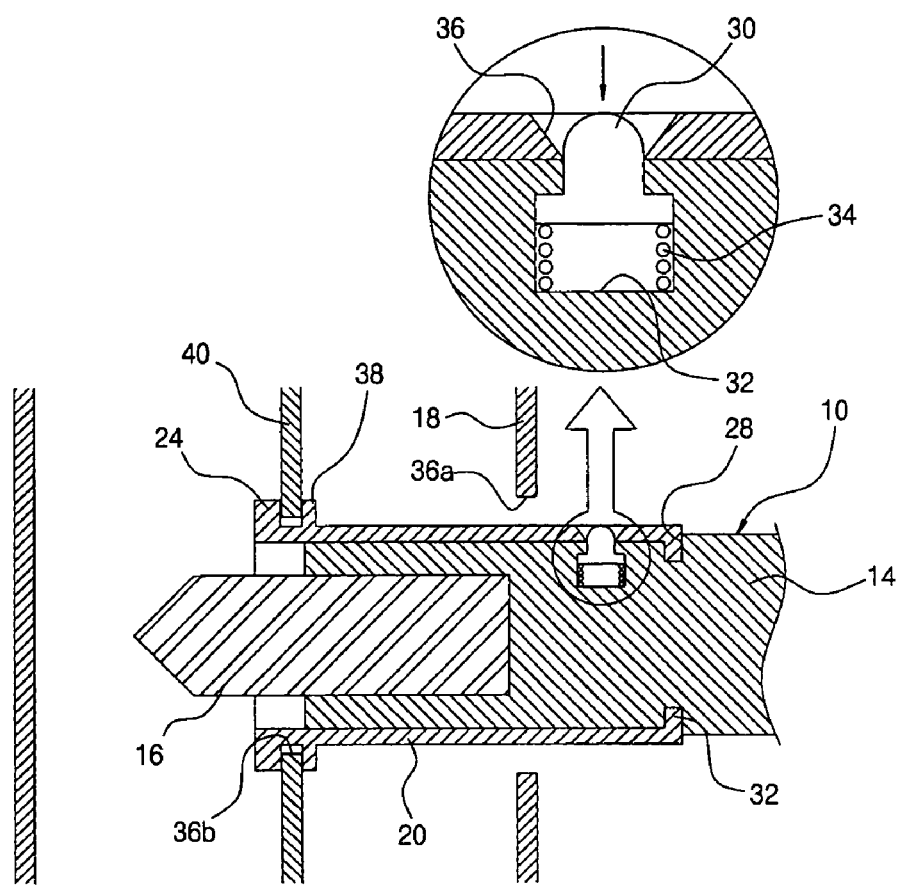
FIG. 5 is a partially enlarged sectional view of an engaged state of a connecting part of an inner handle according to an embodiment of the present invention.
Figure 6:
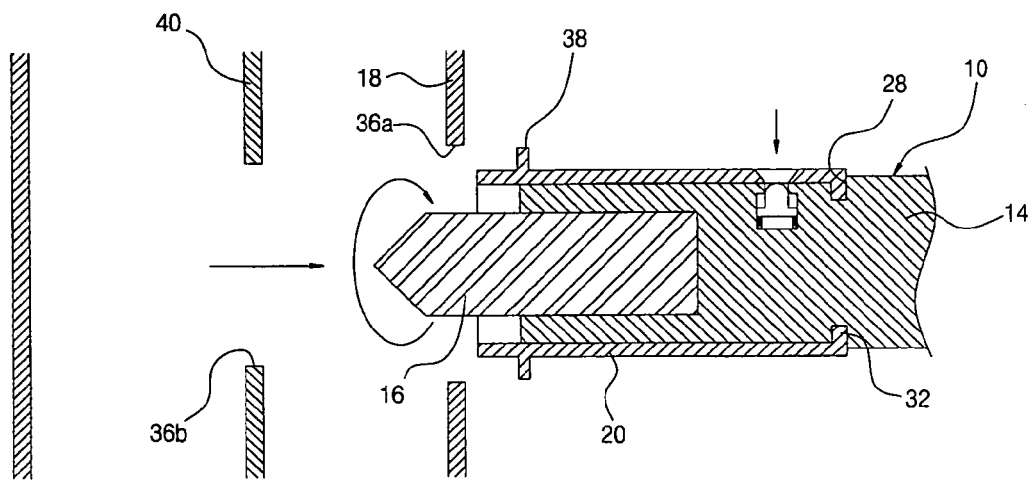
FIG. 6 is a partially enlarged sectional view of a disengaged state of a connecting part of an inner handle according to an embodiment of the present invention.

The connecting part 14 of the inner handle 10 is provided with a stopping means 102 that prevents unintentional rotation of the locking means. The connecting part 14 further comprises an inserting groove 28 along the outer circumference thereof, into which the inserting rim 22 of the locking means is rotatably fit. By engaging the inserting rim 22 with the inserting groove 28 in such a manner, the locking means is coupled to the connecting part 14 of the inner panel 10 while freely rotating relative to the connecting part 14. Further, as shown in FIGS. 5 and 6, the connecting part 14 of the inner handle 10 is furnished with a stopping means comprising a recess 32 formed on the surface of the connecting part 14, a spring 34 inserted into the recess 32, and a boss 30 mounted on the upper end of the spring 34 while being resiliently supported by the spring 14. The boss 30 is configured to move up and down within the recess 32. Corresponding to the boss 30, the locking means further comprises a fitting hole 26 for engaging with the boss 30 at the surface of the body 20. As shown in FIG. 5, when the boss 30 protrudes through the fitting hole 26 of the locking means, the rotation of the locking means relative to the connecting part 14 of the inner handle 10 is restrained.

In order for the inner handle 10 having the above-described features to be detachably installed to a pillar trim 18 and a body panel 40, the pillar trim 18 is provided with an opening 36a, through which the body 20 of the locking means passes. Therefore, it should be appreciated that the diameter of the opening 36a be at least the same as that of the supporting rim 38 formed around the body 20 of the locking means. The body panel 40 interposed between the pillar trim 18 and an outer panel is likewise provided with an opening 36b whose diameter is substantially the same as the diameter of the body 20. The opening 36b formed on the body panel 40 is further provided with an additionally opened section 42 of a rectangle shape, through which the couple of the locking tips 24 passes.

Figure 2:
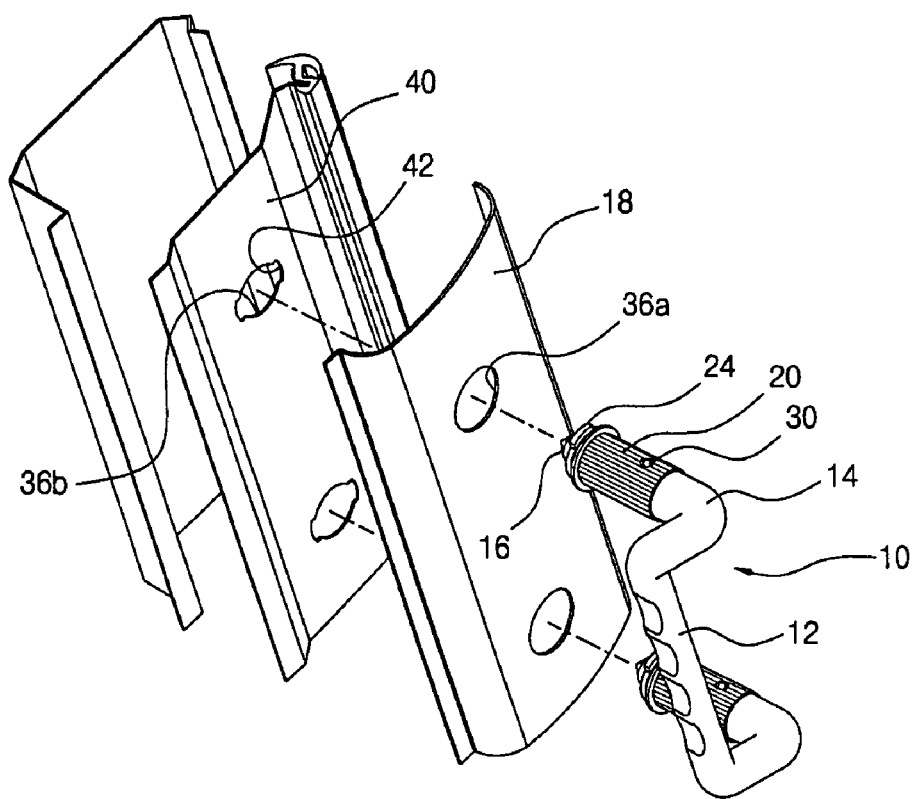
FIG. 2 is an exploded perspective view of a mounting structure of an inner handle according to an embodiment of the present invention.
Figure 3:
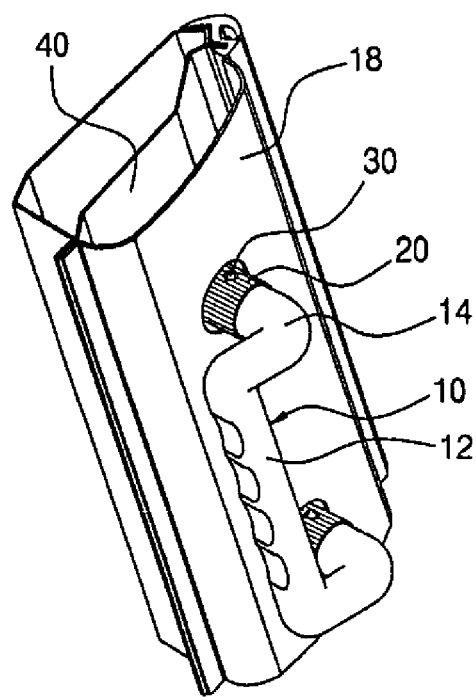
FIG. 3 is a perspective view of an inner handle attached to a pillar trim and a body panel according to an embodiment of the present invention.

Hereinafter, the mounting structure of the inner handle according to the present invention is described in detail with reference to the accompanying FIGS. 2 and 3. As shown in FIG. 2, the front portion of the body 20 of the locking means passes through the openings 36a, 36b formed on the pillar trim 18 and the body panel 40, respectively, until the supporting rim 38 contacts the circumference of the opening 36b of the body panel 40. At this time, the locking tips 24 are aligned to the additionally opened section 42 so as to pass through the body panel 40.

After inserting the front portion of the body 20 of the locking means into the openings 36a and 36b until the supporting rim 38 contacts the front surface of the opening 36b of the body panel 40, the body 20 of the locking means is rotated by approximately 90 degrees, so that the locking tips 24 is brought into contact with the back surface of the circumference of the opening 36b of the body panel 40. Therefore, the inner handle 10 is securely fixed to the body panel 40 of a vehicle.

As the locking means is secured to the body panel 40 of the vehicle by means of the locking tips 24, the boss 30 installed in the connecting part 14 of the inner handle 10 protrudes through the fitting hole 26 formed on the body 20 of the locking means, thereby restraining the rotation of the body 20.

Figure 4:
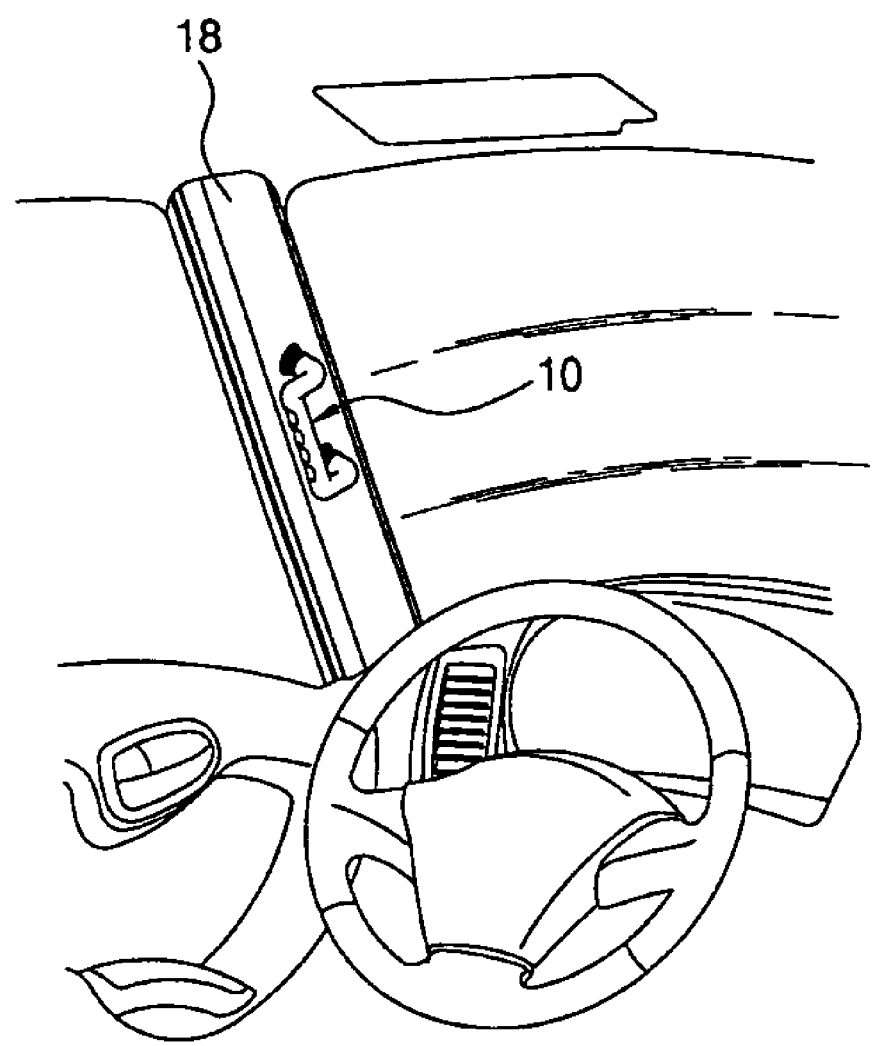
FIG. 4 is a perspective view of an inner handle installed inside a vehicle according to an embodiment of the present invention.

FIG. 4 shows the inner handle according to the present invention, as attached to a pillar trim of a vehicle. Hereinafter, the disengagement of the inner handle for using as an emergency hammer to break or smash the glass of the windows of the vehicle in the event of an emergency is described with reference to FIGS. 5 and 6. If a traffic accident or other emergencies prevent the doors of a vehicle from being opened, the persons locked inside may rotate the body 20 of the locking means while pushing the boss 30 so as to release the locking state of the body 20. When the body 20 rotates by approximately 90 degrees, the locking tips 24 of the body 20 is aligned with the additionally open section 42 of the opening 36b formed on the body panel 40, where the body 20 of the locking means can be disengaged from the body panel 40.

Subsequently, the hammer head 16 is exposed upon disengagement of the inner handle 10 from the body panel 40 and the pillar trim 18. With the hammer head 16, the persons locked inside may break or smash the glass of the windows of the vehicle in order to escape from the vehicle.

As described above, the inner handle according to the present invention can serve as an emergency hammer to break or smash the glass of the windows of the vehicle by integrally forming a hammer head therein and providing a detachable structure in the event of an emergency. Moreover, the inner handle according to the present invention is advantageous in view of economic stands in that fastening process for the inner handle can be omitted and in that the cost for providing additional emergency tools can be saved.

Even though the present invention is described in detail with reference to the foregoing embodiments, it is not intended to limit the scope of the present invention thereto. It is evident from the foregoing that many variations and modifications may be made by a person having an ordinary skill in the present field without departing from the essential concept of the present invention.

What is claimed is:

1. A mounting structure of an inner handle for a vehicle, comprising:
    an inner handle having a grabbing part and at least one connecting part perpendicularly extending from the grabbing part;
    at least one hammer head made of a high-strength material, each of the at least one hammer head installed to an end of a respective one of the at least one connecting part;
    at least one locking means, each rotatably mounted to a respective one of the at least one hammer head and a respective one of the at least one connecting part;
    at least one stopping means, preventing unintentional rotation of a respective one of the at least one locking means;
    a pillar trim having at least one opening through each of which a front portion of a respective one of the at least one locking means passes; and
    a body panel having at least one opening at each of which the front portion of a respective one of the at least one locking means is detachably engaged.

2. The mounting structure of an inner handle according to claim 1, wherein each of the at least one locking means comprises:
    a hollow body;
    an inserting rim inwardly extending from a rear end of the hollow body;

a couple of locking tips outwardly extended from a front end of the hollow body;

a supporting rim outwardly extended from the hollow body, adjacent to the locking tips; and a fitting hole at a surface of the hollow body for engaging with a boss of a respective one of the at least one stopping means.

3. The mounting structure of an inner handle according to claim 2, wherein a diameter of each of the at least one opening formed in the pillar trim is at least the same as a diameter of the supporting rim formed around the body of a respective one of the at least one locking means, wherein each of the at least one opening formed in the body panel is provided with an additional opened section for entering the couple of locking tips.

4. The mounting structure of an inner handle according to claim 2, wherein each of the at least one connecting part of the inner handle further comprises an inserting groove along a circumference thereof, into which the inserting rim of a respective one of the at least one locking means is rotatably fit.

5. The mounting structure of an inner handle according to claim 1, wherein each of the at least one stopping means comprises:

a recess formed on a surface of a respective one of the at least one connecting part;

a spring inserted in the recess; and a boss resiliently supported by the spring.

6. The mounting structure of an inner handle according to claim 5, wherein each of the at least one locking means further comprises a fitting hole for engaging with the boss.

7. The mounting structure of an inner handle according to claim 1, wherein each of the at least one locking means comprises a fitting hole for engaging with a boss of a respective one of the at least one stopping means.

8. The mounting structure of an inner handle according to claim 1, wherein each of the at least one connecting part of the inner handle comprises an inserting groove along a circumference thereof, into which an inserting rim of a respective one of the at least one locking means is rotatably fit.

* * * * *